United States Patent
Ohlsson

(10) Patent No.: US 9,805,560 B2
(45) Date of Patent: *Oct. 31, 2017

(54) ANTI-SKIMMING CARD READER

(71) Applicant: Wayne Fueling Systems LLC, Austin, TX (US)

(72) Inventor: Mats Ohlsson, Alta (SE)

(73) Assignee: Wayne Fueling Systems LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,084

(22) Filed: Dec. 27, 2016

(65) Prior Publication Data

US 2017/0186282 A1    Jun. 29, 2017

Related U.S. Application Data

(63) Continuation of application No. 14/980,339, filed on Dec. 28, 2015, now Pat. No. 9,589,427.

(51) Int. Cl.
| | | |
|---|---|---|
| G07F 19/00 | (2006.01) | |
| G06K 7/00 | (2006.01) | |
| G06K 7/08 | (2006.01) | |
| G06K 13/08 | (2006.01) | |

(52) U.S. Cl.
CPC ....... *G07F 19/2055* (2013.01); *G06K 7/0004* (2013.01); *G06K 7/0069* (2013.01); *G06K 7/0073* (2013.01); *G06K 7/087* (2013.01); *G06K 13/0881* (2013.01)

(58) Field of Classification Search
None
See application file for complete search history.

(56) References Cited

U.S. PATENT DOCUMENTS

| | | | | |
|---|---|---|---|---|
| 5,929,427 A | * | 7/1999 | Harada | G06K 7/0013 235/486 |
| 2016/0335462 A1 | * | 11/2016 | Lamfalusi | G06K 7/0004 |

FOREIGN PATENT DOCUMENTS

IE          EP 0863477 A1 * 9/1998 ........... G06K 7/0004

* cited by examiner

*Primary Examiner* — Kristy A Haupt
(74) *Attorney, Agent, or Firm* — Mintz Levin Cohn Ferris Glovsky and Popeo, P.C.

(57) ABSTRACT

Methods and devices are provided for reading both chip and magnetic stripe cards, and in particular for preventing use of a magnetic stripe when a chip is present, in various settings such as fuel dispensers, ATMs, and retail settings. For example, a card reading device is provided that includes a housing and at least one card slot. A smart card reader and a magnetic stripe card reader are disposed within the housing. In one embodiment, a gate is configured to prevent insertion of a card into a rear portion of the card slot when a chip is detected to prevent the magnetic stripe card reader from reading a magnetic stripe. In another embodiment, a first card slot has a first depth that prevents insertion of a magnetic stripe but allows reading of a chip, and a second slot has a depth that allows insertion of a magnetic stripe.

10 Claims, 6 Drawing Sheets

ANTI-SKIMMING CARD READER

CROSS REFERENCE TO RELATED APPLICATIONS

This application is a continuation of U.S. patent application Ser. No. 14/980,339 filed Dec. 28, 2015 and entitled "Anti-Skimming Card Reader," which is incorporated herein by reference in its entirety

FIELD

Methods and devices are provided for reading a credit card having both a microchip and a magnetic stripe, and in particular for preventing use of a magnetic stripe when a microchip is present.

BACKGROUND

Credit card readers are required in a large number of situations, such as when paying for fuel at a fuel dispenser, an Automated Teller Machine (ATM), or in a retail setting. A card reader allows a customer to pay more efficiently without having to hand a credit card over to an employee or, in some situations like at a fuel dispenser or an ATM, even interact with an employee. Card readers can be manual or motorized. Manual card readers require the user to insert a credit card into the card reader and then pull it back out. A motorized card reader accepts a credit card into a card slot from a user, and the reader has rubber wheels that draw the card inside. The user thus has control over the credit card when using a manual card reader, and the card reader itself has control over the credit card when a user is interacting with a motorized card reader. Often a motorized card reader is secured so it will not be possible to access the components of the reader without breaking a tamper switch. This extra security helps to protect credit cards used in the motorized card reader, but a motorized card reader is often more difficult and expensive to maintain because of the increased complexity of the reader. A manual card reader is often less expensive to maintain because of the lack of any motorized components to accept the card. Moreover, a user will always have physical control of the card thus preventing the risk of the card becoming stuck in the reader.

One drawback with both manual and automatic card readers is that they can be susceptible to skimming. This is especially problematic with magnetic stripes, which are commonly used on credit cards and other cards and which are vulnerable to being read or accessed by a third party monitoring the card reader through a variety of different techniques.

Recently, many credit cards have started to include a microchip and pin system to circumvent the vulnerabilities of traditional magnetic stripe use. These cards are often referred to as "chip cards" or "smart cards." In order to accommodate the use of a chip card, many readers now accept both types of payment (chip and magnetic stripe). Card readers in retail locations often include a slot for slidably receiving a magnetic stripe and a separate slot for insertably receiving a chip. Customers are often unfamiliar with the potential problems of using a magnetic stripe on their credit cards and are not yet accustomed to using the chip reader. Customers are thus likely to use the slot for the magnetic stripe even though their card contains a chip. Card readers in fuel dispensers or other outdoor locations, on the other hand, often have a single slot used for both a magnetic stripe and a chip. Once a card is passed through the magnetic stripe reader, it is susceptible to being "skimmed." "Skimmers" are small devices that can scan and store credit card data from the magnetic stripe. They are often placed on ATMs or even held in the hand of someone nearby. When a credit card is run through a skimmer, the device stores the credit card information. Thieves can use the stolen data to make fraudulent charges either online or with a counterfeit credit card.

Accordingly, there remains a need for methods and devices for preventing skimming of cards in a card reader.

SUMMARY

Various card reader devices and methods for reading cards are provided. The methods and devices are particularly configured to prevent use of a magnetic stripe when a chip is present on a card, thereby preventing skimming of the magnetic stripe data.

In one aspect, a card reading device is provided that includes a housing, a card slot, a smart card reader, and a magnetic stripe card reader. The card slot is formed in the housing and has a front portion adjacent to an opening of the card slot, a rear portion, and a gate formed between the front and rear portions. The smart card reader is disposed within the housing adjacent the front portion of the card slot and is configured to read a chip on a card inserted into the front portion of the card slot. The magnetic stripe card reader is disposed within the housing and is configured to read a magnetic stripe on a card inserted into the front and rear portions of the card slot. The gate is configured to prevent insertion of a card into the rear portion of the card slot when a chip is detected to prevent the magnetic stripe card reader from reading a magnetic stripe on a card inserted into the card slot.

The card reading device can vary in a number of ways. In one example, the gate can be movable between open and closed positions, and the gate can be biased to the closed position. As another example, the gate can be configured to move from the closed position to the open position when a card is inserted into the card slot and the smart card reader detects that no chip is present on the card. The card reading device can also include a microprocessor coupled to the smart card reader and the magnetic stripe reader. The microprocessor can be configured to control the gate. In another embodiment, the gate can be positioned between the smart card reader and the magnetic stripe reader. The gate can have a variety of other configurations, and can be a physical gate or an electrical gate.

In another aspect, a method of using a card reading device is provided that includes inserting a card into a card slot formed in a housing. A gate in the housing prevents insertion of the card into a rear portion of the card slot, a smart card reader detects if the card has a chip, and the gate opens if no chip is detected to allow the card to be inserted into the rear portion of the card slot. When the card is inserted into the rear portion of the card slot, a magnetic stripe card reader reads a magnetic strip on the card. The method can be varied in various ways. For example, the gate can prevent insertion of the card into the rear portion of the card slot when the smart card reader detects a chip on the card.

In another aspect, a card reading device is provided and includes a housing, a first card slot, and a second card slot. The first card slot is formed in the housing and extends in a first orientation. The housing has a magnetic stripe card reader disposed therein that is configured to read a magnetic stripe on a card inserted into the first card slot. The second card slot is formed in the housing and extends in a second orientation such that the second card slot intersects with the first card slot. The housing has a smart card reader disposed therein that is configured to read a chip on a card inserted into the second card slot.

The card reading device can be varied in numerous ways. For example, the magnetic stripe card reader can be configured to detect a chip on a card inserted into the first card slot and, upon detecting the chip, it can be configured to prevent reading of the magnetic stripe on the card inserted into the first card slot. The card reading device can also be configured to instruct the user to use the second card slot when the magnetic stripe card reader detects a chip on the card. The card reading device can include a micro-processor connected to the magnetic stripe card reader and the smart card reader. As another example, the first card slot can have a depth that is greater than a depth of the second card slot. In other aspects, the first card slot can extend horizontally and the second card slot can extend vertically such that the first and second card slots intersect each other at a right angle.

In another aspect, a method of using a card reading device is provided that includes inserting a card into a first card slot formed in a housing and extending in a first orientation. The first card slot has a depth that prevents a magnetic stripe on the card from being fully received therein, and the housing has a smart card reader that detects the presence of a chip on the card when the card is inserted therein. The method also includes inserting the card, if no chip is detected by the smart card reader, into a second card slot formed in the housing and extending in a second orientation that intersects the first orientation of the first card slot. The second card slot has a depth that allows a magnetic stripe on the card to be fully received therein, and the housing has a magnetic stripe reader that reads the magnetic strip on the card.

In one embodiment, the magnetic stripe card reader can detect a chip on a card inserted into the first card slot and, upon detecting the chip, it can prevent reading of the magnetic stripe on the card inserted into the first card slot. The first card slot can return the card to a user when the magnetic stripe card reader detects a chip. The card reading device can also instruct the user to use the second card slot when the magnetic stripe card reader detects a chip.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

Figure 1:
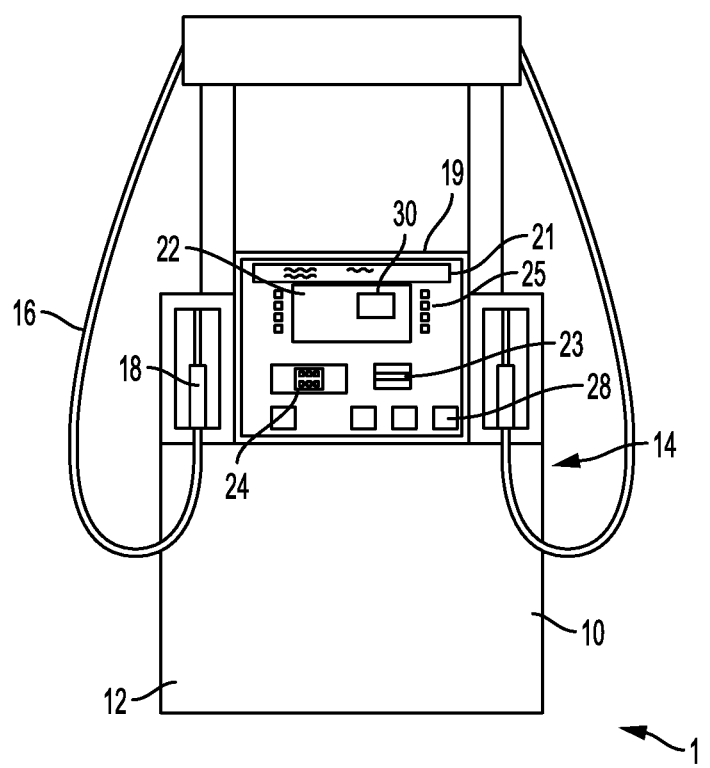
FIG. 1 is a front view of a fuel dispenser.

Various card reader devices and methods for reading cards are provided. The methods and devices are particularly configured to prevent use of a magnetic stripe when a chip is present on a card, thereby preventing skimming of the magnetic stripe data. Card readers are used in a large number of applications. As a non-limiting example, card readers are used in fuel dispensers to collect payment from a customer at the dispenser. FIG. 1 illustrates one embodiment of a fuel dispenser 1 that generally includes a housing base 10 having a front side 12 and a back side 14. While only the front side 12 is discussed herein, the back side 14 can have similar features. In general, the housing base 10 can contain hydraulic(s) (such as fuel pump(s)), meter(s), and/or tube arrangement(s) (not shown) for transportation of fuel to one of more hoses and nozzles. The illustrated dispenser 1 has two hoses 16, each having a nozzle 18 located at a terminal end of the hose 16. However, the fuel dispenser 1 can have any number of hoses. A control system (not shown) can be disposed in the housing base 10 and is coupled to the hydraulic(s), meter(s), and tube arrangement(s). An electronics module 19 is disposed on the housing base 10 and is coupled to the control system. The electronics module 19 can include a processor and it can control the hydraulics in the housing base 10 through the control system, allowing fuel to be dispensed via each nozzle 18.

The illustrated electronics module 19 has a price and volume display 21 that presents information concerning the price and volume of any fuel being dispensed, and a graphical display 22 that presents a user interface for displaying information to a customer and/or for interacting with a customer. The illustrated electronics module 19 also has a keypad 24 and buttons 25 that allow the user to interact with the electronics module 19, a card reader 23 that allows the user to pay for purchases, and grade selection buttons 28 that allow the user to select the grade of fuel to be dispensed by the fuel dispenser 1. While only one fuel dispenser 1 is shown, one or more fuel dispensers 1 can be grouped together in a single location. Additionally, the fuel dispenser 1 can contain more than one hose 16 and nozzle 18 combination. For example, four hoses 16 and nozzles 18 can be provided for use on the front side 12 of the housing base 10, while an additional four hoses 16 and nozzles 18 can be provided for use on the back side 14. A person skilled in the art will appreciate that the fuel dispenser can have a variety of configurations and the illustrated dispenser configuration is merely representative of one type of fuel dispenser.

Figure 2A:
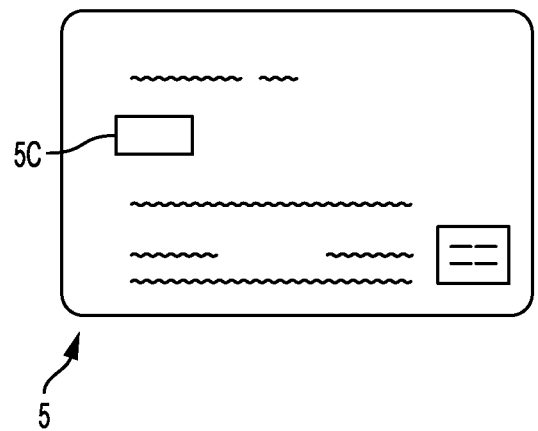
FIG. 2A is a front view of a card with a chip and a magnetic stripe.
Figure 2B:
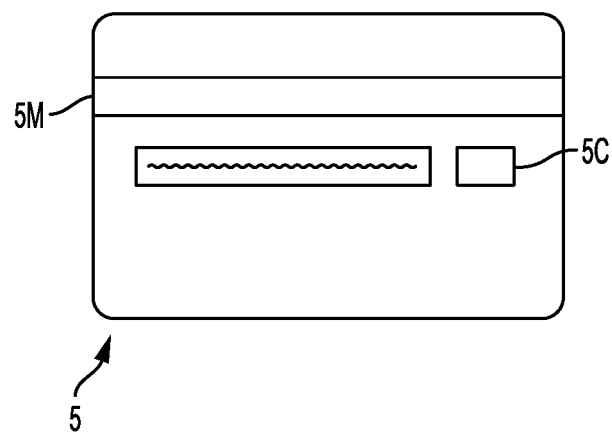
FIG. 2B is a back view of the card of FIG. 2A showing the magnetic stripe.

As indicated above, a card reader is provided, e.g. such as a card reader used in a fuel dispenser as provided above, and it is configured to prevent use of a magnetic stripe on the card when a chip is present on the card. Such a reader will therefore prevent skimming of the data from the magnetic stripe. In one embodiment, the reader can generally include a housing and at least one card slot. The reader can be configured to read both a magnetic stripe and a chip on a card, and in an exemplary embodiment the reader is a manual card reader. As seen in FIGS. 2A and 2B, a card 5 has a chip 5c embedded in the card 5 and a magnetic stripe 5m on the back of the card. The location of the chip and the magnetic stripe can vary depending on the card. Card readers are known in the art and any card reader capable of reading a magnetic stripe and/or a chip can be used herein for any of the embodiments. A smart card reader can be disposed within the housing, and the smart card reader can read a chip on a card inserted into the at least one card slot, allowing a user to pay with a smart card using the card reader. A smart card is a card with a chip embedded therein, and a smart card reader is a reader configured to read the chip embedded in the smart card. A magnetic stripe card reader can also be disposed within the housing, and the magnetic stripe card reader can read a magnetic stripe on a card inserted into the at least one card slot. In one embodiment, the card reader housing can be configured to prevent use of the magnetic stripe card reader when a smart card is detected. In another embodiment, the card slots can be configured to prevent use of the magnetic stripe during use of a smart card reader.

Figure 3:
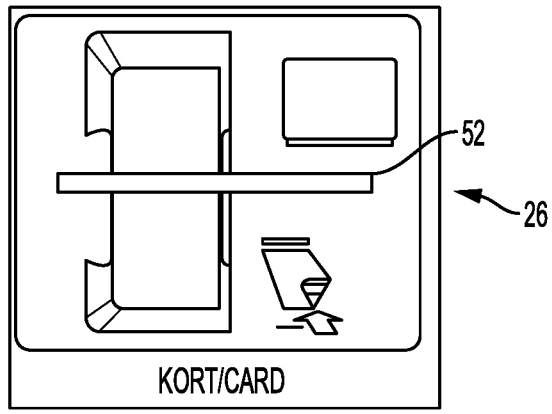
FIG. 3 is a front view of a card reader.

FIG. 3 illustrates one exemplary embodiment of a card reader 26 having a housing 50 and a card slot 52. The card reader 26 can be incorporated into a fuel dispenser, such as fuel dispenser 1 shown in FIG. 1. However, the card reader 26 is not limited to this use. The card reader 26 can be incorporated into various other devices and applications, such as in ATMs and at retail store locations. The card slot can be arranged in any orientation, for example horizontally as shown in FIG. 3. The card slot 52 has a front portion 52f adjacent to an opening 52e of the card slot 52, as illustrated in a top-down view of the card reader 26 in FIG. 4. A smart card reader 56 is positioned within the housing 50 of the card reader 26 and is positioned adjacent to the front portion 52f of the card slot 52 such that the smart card reader 56 can read a chip on a smart card inserted into the front portion 52f of the card slot 52. The card slot 52 also has a rear portion 52r at a rear of the card slot 52. A magnetic stripe card reader 58 is positioned within the housing 50 of the card reader 26 and it extends across the rear portion 52r and at least a portion of the front portion 52f of the card slot 52 such that the magnetic stripe card reader 58 can read a magnetic stripe on a card inserted into the front and rear portions 52f, 52r of the card slot 52. The magnetic stripe card reader 58, however, is configured such that it is incapable of reading a magnetic stripe on a card inserted only into the front portion 52f of the card slot 52.

Figure 4:
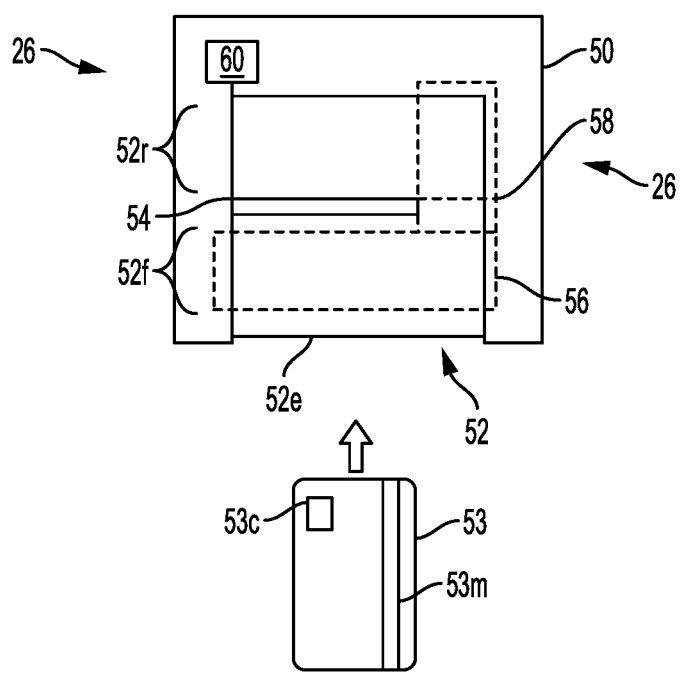
FIG. 4 is a top-down view of the card reader of FIG. 3.

As further shown in FIG. 4, a gate 54 is positioned within the housing 52 and is formed between the front portion 52f and the rear portion 52r. The gate 54 can move between an opened position and a closed position. In the opened position, the gate 54 allows unrestricted access to the card slot 52, thus allowing a card to be fully inserted through the front portion 52f and into the rear portion 52r. In the closed position, the gate 54 blocks the card slot 52, allowing a card to be inserted into the front portion 52f of the card slot while preventing insertion into the rear portion 52r of the card slot. Since the card is prevented from being fully inserted into the slot, the magnetic stripe will not align with or magnetically couple with the magnetic stripe card reader 58, thus preventing activation of the magnetic stripe card reader 58.

The smart card reader 58 can be configured to detect whether a chip 53c is present when a card is inserted into the front portion 52f of the card slot 52. If the chip 53c is detected, a signal can be sent to the gate and the gate will remain closed, preventing full insertion of the card thereby preventing the magnetic stripe card reader 58 from being able to read a magnetic stripe 53m on the card. The gate 54 can thus prevent skimming of a card by preventing use of a magnetic stripe on a smart card. If no chip is detected, a signal can be sent to the gate instructing the gate to open. When the gate is open, the card can be fully inserted into the card slot and the magnetic stripe card reader 58 can read a magnetic stripe on an inserted card. In an exemplary embodiment, the gate 54 defaults to the closed position and only moves to the open position if the card inserted into the front portion of the card slot lacks a chip. However, the gate can vary, for example by defaulting to the open position and moving to the closed position if a chip is detected.

The gate 54 can have a variety of configurations. In one embodiment, the gate is a physical gate that physically blocks insertion of a card when the gate is in the closed position. In another embodiment, the gate can be an electronic gate or a sensor that disables the magnetic stripe card reader if a chip is detected or alternatively enables the magnetic stripe card reader if no chip is detected.

The housing 50 can also include a microprocessor 60 coupled to any one or more of the smart card reader 56, the magnetic stripe card reader 58 and the gate 54. The microprocessor 60 can be configured to control movement of the gate between the open position and the closed position, e.g., by receiving a signal from the smart card reader indicating whether a chip is detected, and sending a signal to the gate instructing the gate to open or close. However, the card reader can also use a processor that is present in the fuel dispenser 1 and that is used to control other components in the fuel dispenser. Other means of controlling the gate, the smart card reader, and/or the magnetic stripe card reader can also be used.

Figure 5:
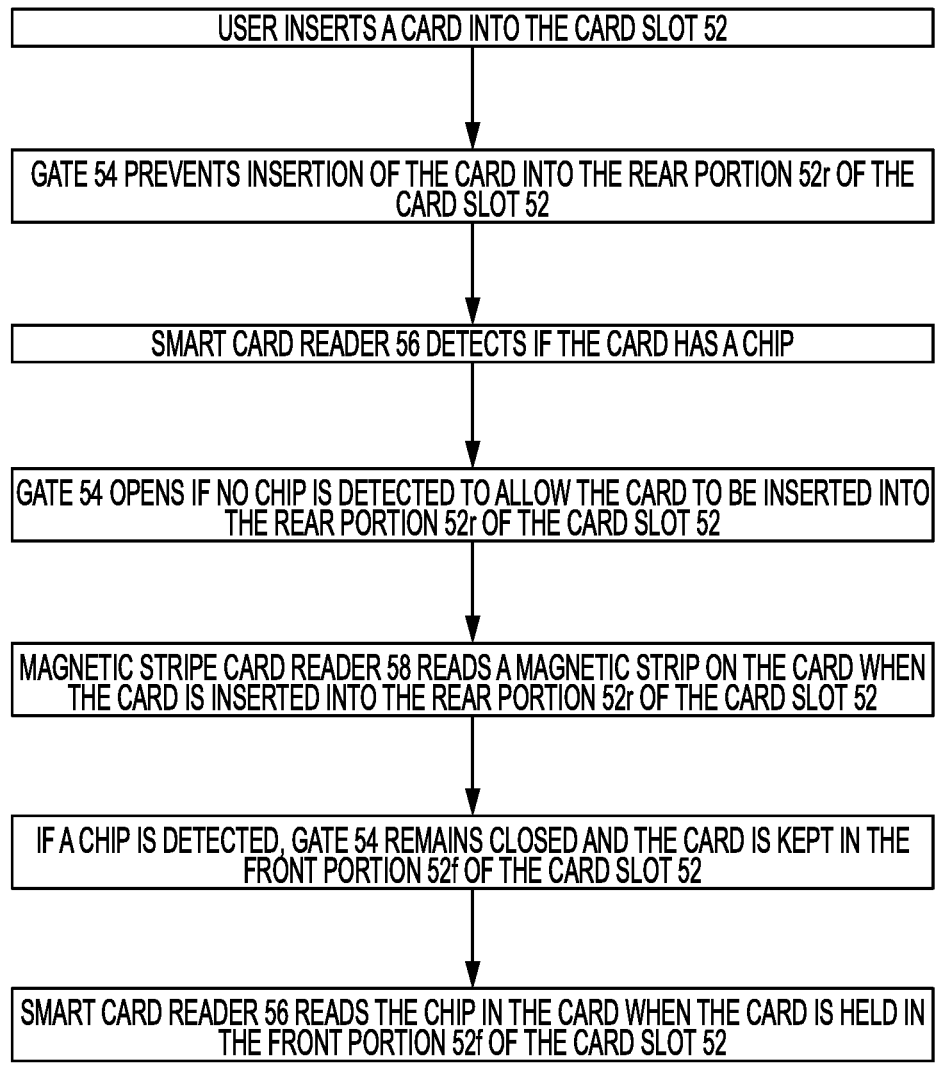
FIG. 5 is an exemplary process flow for the card reader of FIG. 3.

In use, as shown in FIG. 5, a user inserts a card into the card slot 52 to complete an act of paying. The gate 54 in the housing 50 prevents insertion of the card into the rear portion 52r of the card slot 52. The smart card reader 56 is activated and attempts to detect if the card has a chip. If no chip is detected, the gate 54 opens to allow the card to be inserted into the rear portion 52r of the card slot 52, where the magnetic stripe card reader 58 will read a magnetic stripe on the card once the card is fully inserted into the rear portion 52r of the card slot 52. If a chip is detected, the gate 54 remains closed and the card is kept in the front portion 52f of the card slot 52. The smart card reader 56 reads the chip in the card when the card is held in the front portion 52f of the card slot 52.

In another embodiment, a card reader can generally include a housing with a first card slot and a second card slot. Each card slot can have a depth that differs from one another. Moreover, the first card slot can be positioned in the housing in a first orientation. The first card slot can accept a card therein. A magnetic stripe card reader can be disposed in the housing adjacent to the first card slot such that the magnetic stripe card reader can read a magnetic stripe on a card inserted into the first card slot. The second card slot can also be positioned in the housing in a second orientation different than the first orientation of the first card slot. In one embodiment, the second card slot can intersect the first card slot. The second card slot can also accept a card therein. A smart card reader can be disposed in the housing adjacent to the second card reader such that the smart card reader can read a chip on a card inserted into the second card slot. Thus a user can insert a card into either the first card slot or the second card slot according to the card type, allowing a chip in a smart card to be read by the smart card reader without the magnetic stripe card reader reading a magnetic stripe on the smart card. This lack of access to the magnetic stripe prevents skimming attacks by only allowing the magnetic stripe to be accessed when a user inserts a card into the first card slot and not the second card slot. In another embodiment, it is possible for the magnetic stripe card reader to detect the presence of a chip from a smart card.

Figure 6:
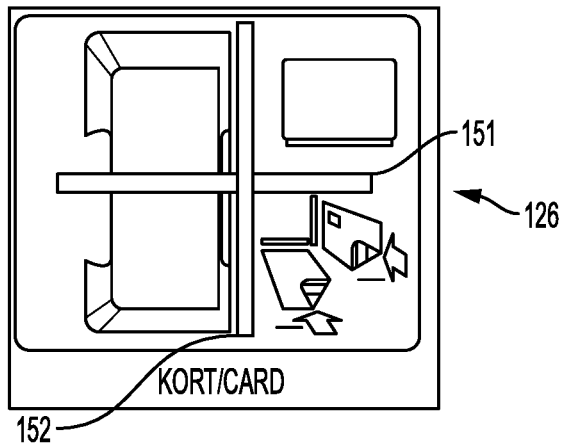
FIG. 6 is a front view of another embodiment of a card reader.

FIG. 6 illustrates one exemplary embodiment of a card reader 126 having a housing 150, a first card slot 151, and a second card slot 152. The first card slot and the second card slot can intersect each other in a variety of orientations, such as perpendicularly as shown in FIG. 6. The first card slot and the second card slot can extend parallel to one another or they can extend at a variety of other orientations and locations in the housing. The card reader 126 is similar to the card reader 26 described above and can be incorporated into a variety of fuel dispensers, such as the fuel dispenser 1. As with card reader 26, however, card reader 126 can be incorporated into various other devices and applications, such as in ATMs and at retail store locations. A magnetic stripe card reader 158 is positioned within the housing 550 of the card reader 126 adjacent to the first card slot 151, as illustrated in a top-down view of the card reader 126 in FIG. 7. The magnetic stripe card reader 158 reads a magnetic stripe on a card 153 inserted into the card slot 151. The first card slot 151 has a depth in the housing 150 that is deep enough to accept enough of a card to allow the magnetic stripe card reader 158 to read a magnetic stripe on the card. As further shown, a smart card reader 156 is positioned within the housing 150 of the card reader 126 adjacent to the second card slot 152. The smart card reader 156 can be configured to read a chip on a smart card inserted into the second card slot 152. The second card slot 152 can have a depth in the housing 150 that is only deep enough to accept enough of a card to allow the smart card reader 156 to read a chip embedded in the card. For example, the depth of the second card slot 152 can be approximately half of the depth of the first card slot 151. The shallower depth of the second card slot 152 prevents reading of a magnetic stripe when a card is inserted into the second card slot 152. Thus a magnetic stripe on a card cannot be skimmed when the card is inserted into the second card slot 152 because the magnetic stripe cannot be read.

Figure 7:
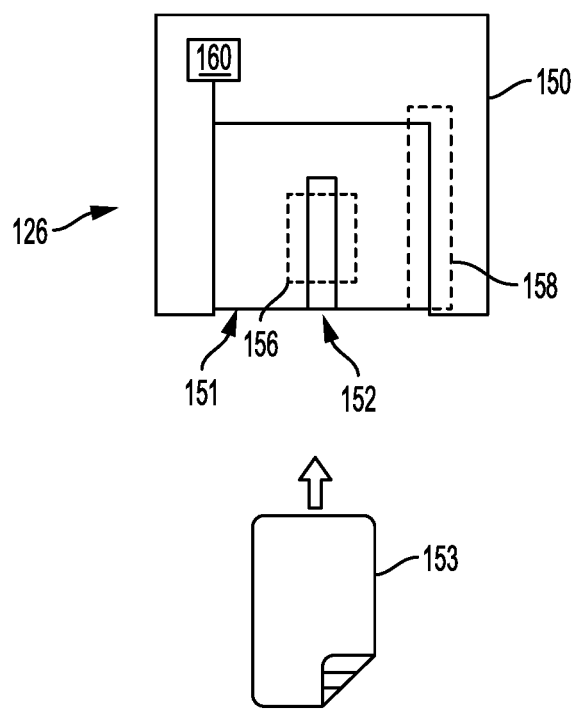
FIG. 7 is a top-down view of the card reader of FIG. 6.

While the depth of the second card slot 152 can be approximately half of the depth of the first card slot 151 in FIG. 7, the depth of each slot can vary. For example, the depths may be the same as long as the magnetic stripe card reader and the smart card reader are able to read magnetic stripes and chips of inserted cards, respectively.

In other aspects, when a card is inserted into either the first or the second card slot 151, 152, whichever one of the magnetic stripe card reader 158 or the smart card reader 156 is not in use can be disabled until the card is withdrawn from the other card slot. However, in other embodiments the readers can both be continually enabled, as well. If a smart card is detected as being inserted into the first card slot or a magnetic stripe card is detected as being inserted into the second card slot, various embodiments of the card reader can provide instructions to the user to remove the card and insert the card in the appropriate card slot to use either the smart card reader or the magnetic stripe card reader. These instructions can be auditory instructions played for the user, visual instructions provided on a screen in front of the user, printed instructions attached to the card reader, or any number of variations that provide instructions to a user if the user attempts to use the wrong card slot.

In one embodiment, the magnetic stripe card reader 158 can be configured to detect the presence of a chip on a smart card. The magnetic stripe card reader 158 can also be configured to be in a deactivated state to prevent the reader from reading the magnetic stripe on the card, will not read the magnetic stripe on the card, and the card will thus not be exposed to a skimming attack.

A microprocessor 160 can be coupled to the smart card reader 156 and the magnetic stripe card reader 158, and it can be configured to control both readers 156, 158. However, the card reader 126 can also use a processor that is present in a fuel dispenser or it can use other means of controlling the smart card reader and the magnetic stripe card reader.

Figure 8:
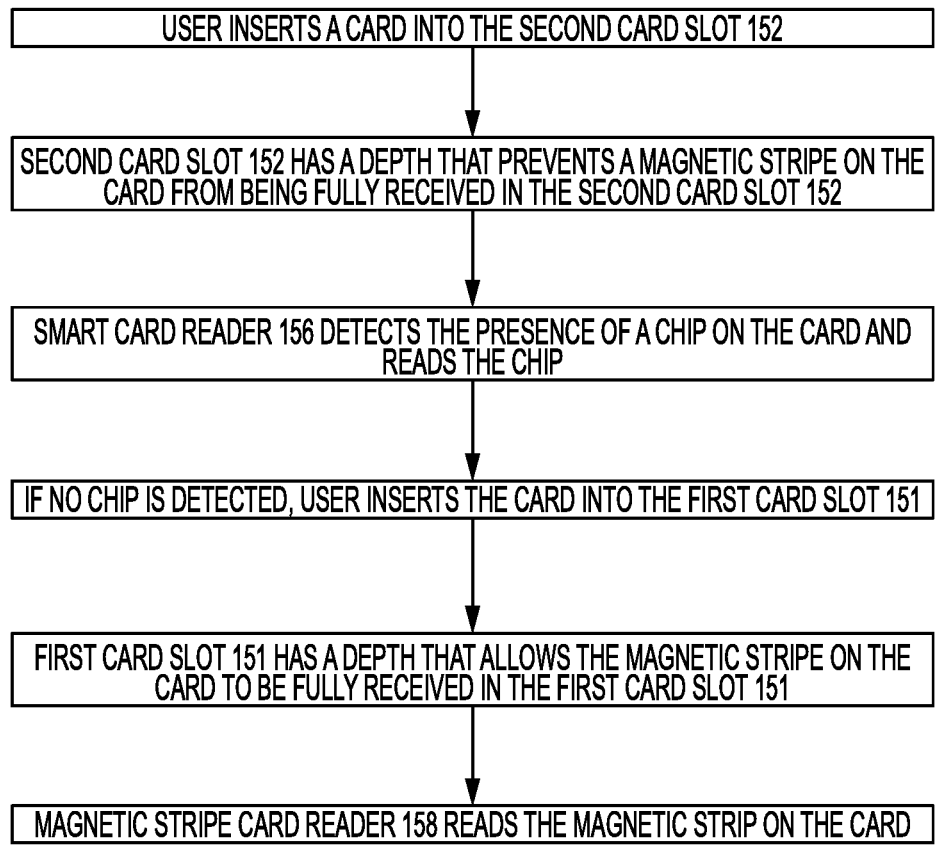
FIG. 8 is an exemplary process flow for the card reader of FIG. 6.

In use as shown in FIG. 8, a user inserts a card into the second card slot 152 to complete an act of paying. The second card slot 152 has a depth that prevents a magnetic stripe on the card from being fully received in the second card slot 152. The smart card reader 156 in the housing 150 detects the presence of a chip on the card when the card is inserted in the second card slot 152 and reads the chip. If no chip is detected, a user inserts the card into the first card slot 151. The first card slot 151 has a depth that allows the magnetic stripe on the card to be fully received in the first card slot 151. The magnetic stripe card reader 158 in the housing 150 reads the magnetic strip on the card.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A card reading device, comprising:
a housing;
a first card slot formed in the housing and extending in a first orientation, the housing having a magnetic stripe card reader disposed therein and configured to read a magnetic stripe on a card inserted into the first card slot; and
a second card slot formed in the housing and extending in a second orientation different than the first orientation such that the second card slot intersects with the first card slot at a non-zero angle, the housing having a smart card reader disposed therein and configured to read a chip on a card inserted into the second card slot.

2. The card reading device of claim 1, further comprising a micro-processor connected to the magnetic stripe card reader and the smart card reader.

3. The card reading device of claim 1, wherein the first card slot has a depth that is greater than a depth of the second card slot.

4. The card reading device of claim 1, wherein the first card slot extends horizontally and the second card slot extends vertically such that the first and second card slots intersect each other at a right angle.

5. The card reading device of claim 1, wherein the magnetic stripe card reader is configured to detect a chip on a card inserted into the first card slot and, upon detecting the chip, is configured to prevent reading of the magnetic stripe on the card inserted into the first card slot.

6. The card reading device of claim 5, wherein the card reading device is configured to instruct the user to use the second card slot when the magnetic stripe card reader detects a chip.

7. A method of using a card reading device, comprising:
   inserting a card into a first card slot formed in a housing and extending in a first orientation, the first card slot being configured to prevent a magnetic stripe on the card from being read, and the housing having a smart card reader that detects the presence of a chip on the card when the card is inserted therein; and
   inserting the card, if no chip is detected by the smart card reader, into a second card slot formed in the housing and extending in a second orientation that intersects the first orientation of the first card slot, the second card slot being configured to allow the magnetic stripe on the card to be read by a magnetic stripe reader therein.

8. The method of claim 7, wherein the magnetic stripe card reader detects a chip on a card inserted into the first card slot and, upon detecting the chip, prevents reading of the magnetic stripe on the card inserted into the first card slot.

9. The method of claim 8, wherein the first card slot returns the card to a user when the magnetic stripe card reader detects a chip.

10. The method of claim 9, wherein the card reading device instructs the user to use the second card slot when the magnetic stripe card reader detects a chip.

\* \* \* \* \*